United States Patent [19]

Mann

[11] 4,187,734
[45] Feb. 12, 1980

[54] ELECTRIC REGULATING DEVICE

[75] Inventor: Arnold Mann, Bieber, Fed. Rep. of Germany

[73] Assignee: VDO Adolf Schindling AG, Frankfurt am Main, Fed. Rep. of Germany

[21] Appl. No.: 860,678

[22] Filed: Dec. 15, 1977

[30] Foreign Application Priority Data

Dec. 22, 1976 [DE] Fed. Rep. of Germany ....... 2658093
Sep. 15, 1977 [DE] Fed. Rep. of Germany ....... 2741475

[51] Int. Cl.² ............................................. F16H 57/00
[52] U.S. Cl. ...................................... 74/405; 180/178; 74/625
[58] Field of Search ............... 180/105 E, 105 R, 110; 74/625, 405, 812

[56] References Cited

U.S. PATENT DOCUMENTS 1,500,687  7/1924  Taylor .................................. 74/405
3,180,168  4/1965  Harris .................................. 74/405

FOREIGN PATENT DOCUMENTS 1047656  12/1958  Fed. Rep. of Germany ............ 74/405

Primary Examiner—Samuel Scott
Assistant Examiner—G. A. Anderson
Attorney, Agent, or Firm—Martin A. Farber

[57] ABSTRACT

An electric regulating device, particularly for a speed control device for motor vehicles, with a servomotor and a rotatably mounted element which actuates the regulating member, the rotatable element particularly being a cable pulley which stands in operative connection with the servomotor via a gearing and a coupling device containing an electromagnet. At least one of the gears of the gearing is radially and at an angle or axially moveable mounted, and is connected indirectly or directly with an armature, which in turn cooperates with the electromagnet.

11 Claims, 6 Drawing Figures

ELECTRIC REGULATING DEVICE

The invention relates to an electrical regulating device, particularly for a speed control device for motor vehicles, with a servomotor and a rotatably mounted element which actuates the regulating member, particularly said element being a cable roller or pulley which stands in operative connection with the servomotor via a mechanical gearing and a coupling device containing an electromagnet.

Regulating or control devices of this type are already known which contain an electric d-c motor, the drive shaft of which stands in operative connection with a shaft via a mechanical gearing and an electromagnetic coupling. On the latter shaft there sits a cable pulley or roller for winding and unwinding, respectively, the line-shaped regulating member, for example, a chain. By the use of an electromagnetic coupling and its arrangement including two coaxial shafts there results an expensive construction of relatively large construction volume. It is true that the construction volume can be reduced by use of a worm gearing or worm drive. Apart from the fact that the size of the construction volume of such a device as before leaves more to be desired, further by the use of the worm gearing or worm drive, the production costs increase. Moreover such a worm gearing drive has a substantially lower efficiency and a considerably higher wear than a spur gear, so that already on this basis alone, in general the use of a worm gearing drive is renounced.

These disadvantages are eliminated and overcome by the present invention. It is thus one object of the invention to provide a regulating device which operates with the smallest possible wear, has a favorable efficiency and a small construction volume, and production costs are as small as possible.

This object is aided in its solution in accordance with another object of the present invention starting out from a regulating device of the introductory described type, in the manner that at least one of the gears (e.g., 14) of the mechanical gearing (13) is radially and inclined at an angle or axially moveably mounted, and is connected indirectly or directly with an armature (20), the latter cooperating with the electromagnet (21).

This measure in accordance with the present invention permits a most extremely packed space-saving or compact construction of the regulating device, which regulating device—because either a coupling in the conventional sense or a worm gearing drive may be used—is subject to a most extremely small wear. The efficiency of this device is substantially greater than that of the known devices. A particular advantage of the regulating device in accordance with the present invention resides in that it is achieved with less construction parts and it has a construction which is more advantageous in its mounting and assembly than that of the known devices.

According to a preferred embodiment of the invention, with a regulating device with a radially moveable gearwheel, the shaft (16) of the gear (14) is deflected or articulated on one of its ends on the housing (1) and the other end is mounted on an arm (19), the latter being disposed on the armature (20). Such a type of embodiment particularly has technical manufacturing and assembly advantages, this the more so when the shaft (16) is formed semi-spherically on its end adjacent to the housing (1) and is mounted in a spherical indentation (17), the latter being formed on the housing (1), and with the shaft (16) transferring on its other end into a pin-shaped shoulder or set-off (18) which is inserted through a corresponding bore in the arm (19), which arm is disposed on the armature. Beyond this it is recommended to form the shaft and the gear as an integral unit made of synthetic or plastic material.

It has proven advantageous to bias the armature (20) or the arm (19) with a spring force such that with a currentless electromagnet (21), the gear (14) can positively come out of engagement from the gearwheel (12) which is coordinated thereto.

With the above and other objects and advantages in view, the present invention will become more clearly understood in connection with the following detailed description of two preferred embodiments, when considered with the accompanying drawings, of which:

Figure 1:
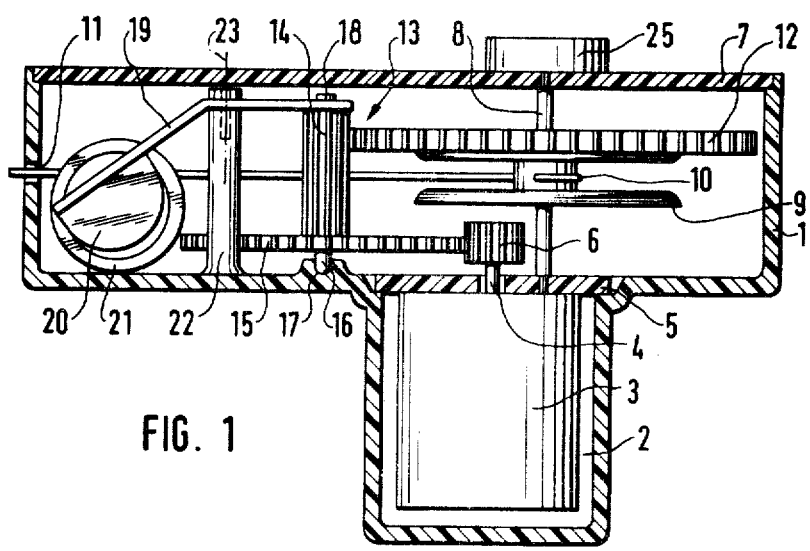
FIG. 1 is a side view, partially in section of a regulating device in accordance with the invention.
Figure 2:
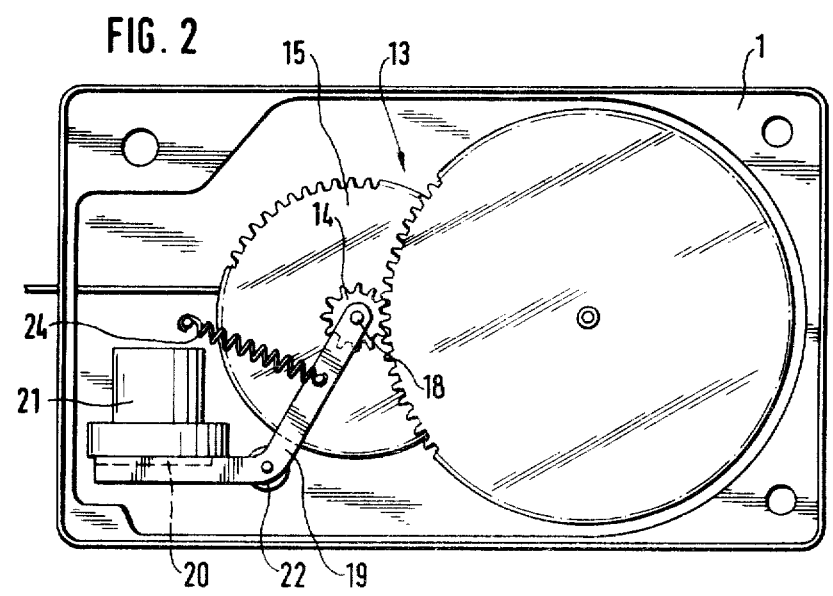
FIG. 2 is a plan view of the regulating device according to FIG. 1 with the cover removed.

Referring now to the drawings, a d.c. motor 3 is located in a cylindrical space 2 in a synthetic material or plastic housing 1 of the regulating device (illustrated in FIGS. 1 and 2), the latter being provided for a speed control device. The shaft 4 of the motor 3 projects through an opening in a closure cover 5 and carries a pinion 6 on its free end.

A shaft 8 is mounted in the closure cover 5 and in the cover 7 of the housing 1, on which shaft 8 there is seated a cable pulley or roller 9 for winding and unwinding the cable-formed regulating member 10. On one side the cable 10 is secured to the cable pulley 9 and the other side it is guided outwardly through an opening 11 in the housing 1 and is articulated to the carburettor or throttle control rod (not illustrated) of the motor vehicle.

A toothed gearwheel 12 is formed on or attached to the cable pulley 9, which gearwheel 12 is a part of the mechanical gearing 13. The mechanical gearing 13 furthermore includes gearwheels 14 and 15, which together with a shaft 16 thereof form an integral unit made of synthetic material or plastic. One end of the shaft 16 is semispherical rounded-off and is mounted in a calotte or spherical indentation 17 which is formed on the housing 1, whereas the other end of the shaft 16 is provided with a pin 18, which pin operatively engages in a corresponding opening in an arm 19 in such manner, that a relative displacement and tilting of the pin 18 in the opening is possible. The arm 19 is disposed on an armature 20 of an electromagnet 21 and is pivotally mounted on a carrier 22 about the axis 23. With the electromagnet 21 applied with current, the pinion 6 stands in operative connection with the cable pulley 9 via the gearwheels 14, 15 and 12, whereas with a currentless electromagnet 21 a tension spring 24 which acts on the arm 19 brings the gear 14 out of engagement from the gear 12 and thus the power flow from the motor 2 to the cable pulley roller 9 is interrupted.

The regulating device furthermore contains a position indicator or encoder 25 which is rigidly coupled with the shaft 8 and the cable pulley 9, respectively, and is formed as a variable rheostat or preset potentiometer. It reports or signals the prevailing respective position of the cable pulley 9 to the control device. The wiring circuitry of the regulating device can occur in known manner in the frame of a speed control device. For this by way of example reference is made to German Auslegeschrift No. 12 14 103 which shows such a circuit wiring.

Figure 3:
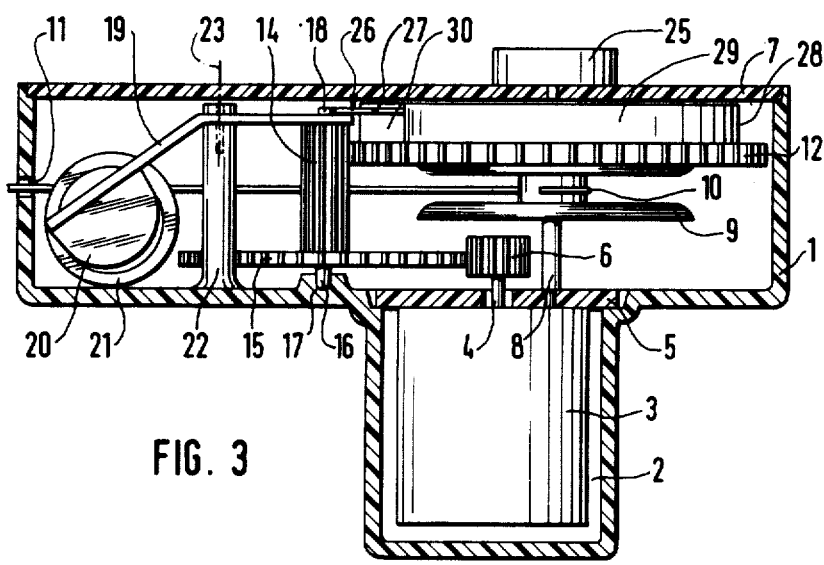
FIG. 3 is a side view, partially in section of another regulating device in accordance with the invention.
Figure 4:
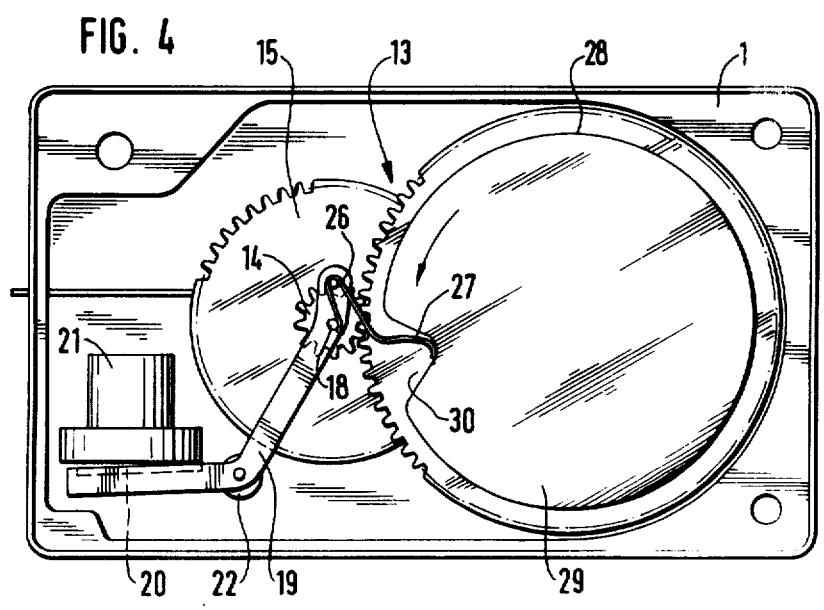
FIG. 4 is a plan view of the regulating device of FIG. 3 with the cover removed.

The regulating device according to FIGS. 3 and 4 essentially has the same construction as the previously described device—merely compared to the tension spring 24, having differences of consequence.

The torsion spring 26 which is provided instead of the tension spring 24 is supported with its free end 27 on the periphery 28 of a circular-shaped cam wheel 29, the latter having a V-shaped cut or recess 30 on one point of its periphery. The cam wheel 29 forms an integral unit with the gearwheel 12 and is arranged concentric to the latter. The position of the cut 30 is selected such that in the neutral regulating position of the cable pulley 9, the spring 26 is supported with its free end 27 on the bottom or base of the cut 30. In this position of the cam wheel 29 and spring 26, the pretension of the spring is small.

As soon as the electromagnet 21 is excited and the armature 20 is attracted or pulled, the gear 14 goes into engagement with the gear 12, which together with the cam wheel 29 begin to turn. In this manner the free end 27 of the spring 26 rises out of the cut 30 on the periphery 28, whereby the pretension of the spring 26 is increased to the necessary degree for a quick and nonobjectional decoupling.

In addition to the already mentioned advantages, the last described regulating device also has the advantage that the two gearwheels 12 and 14 which are coupleable with one another are subject to insignificant wear compared to that of the other regulating device. With an overload of the mechanical gearing, for example in the manner where the cable 10 is completely wound on the cable pulley 9 and thus in spite of the continuing running motor, the gearwheel 12 cannot be moved further, namely the gear 14 is expelled from the gear toothing of the gear 12, whereby the armature is released and breaks-away due to the great pretension of the spring 26 in spite of an excited electromagnet. The result is that not as with the regulating device in accordance with FIGS. 1 and 2 that the teeth of the gearwheel 14 clatter or ratchet over that of the stationary gearwheel 12, but rather the teeth of the gearwheel 14 can rotate without contact with the gearwheel 12. In this manner it is guaranteed that the teeth of both gearwheels are not damaged. A further advantage of the regulating device according to FIGS. 3 and 4 resides in that a coupling engagement can occur or be initiated only in the neutral regulating position of the cable pulley 9. If consequently on the basis of a defect in the regulating device or at the carburettor or throttle control rod, a reverse movement of the cable pulley 9 into its idle regulating position is not possible, then the regulating device cannot be placed in operation. In this respect, the regulating device is subject to control in a non-objectionable operation. A further advantage of this regulating device finally resides in that by the cut 30 and the free end 27 of the spring 26, which free end projects into the cut 30, the zero or neutral position of the cable pulley 9 and consequently also that of the position indicator or encoder 25 are precisely defined. In this manner it is guaranteed that the motor 3 is switched off in the neutral regulating position of the cable pulley 9 via the position indicator 25 and the actual control device and does not run-on until a further operation or restarting of the regulating device.

Figure 5:
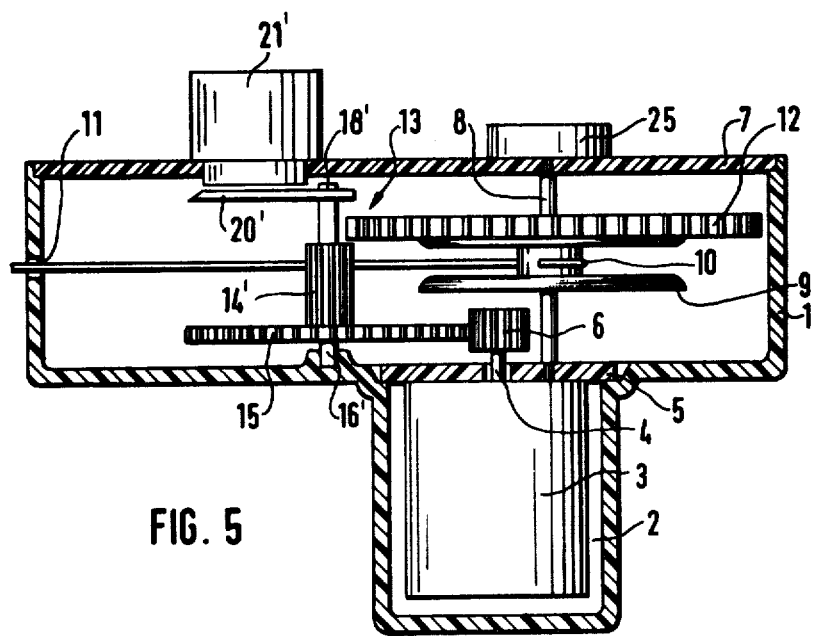
FIG. 5 is a side view partially in section of still another regulating device in accordance with the invention.

FIG. 5 shows a side view, partially in section of another regulating device in accordance with the invention. The device differs from this one according to FIG. 1 in the manner that an electromagnet 21' is arranged on the cover 7 and the armature 20' of the electromagnet 21' is connected directly to the gearwheel 14' and the shaft 16' respectively. When the electromagnet 21' is energized, the armature is drawn into an elevated position in which the gearwheel 14' engages into the gearwheel 12. As soon as the electromagnet 21' is deenergized, the armature 20' falls back in the rest position (this is shown in FIG. 5) and the operative connection between the gearwheels 12 and 14' is interrupted. In this embodiment the gearwheel 14' is moved only in an axial direction.

Figure 6:
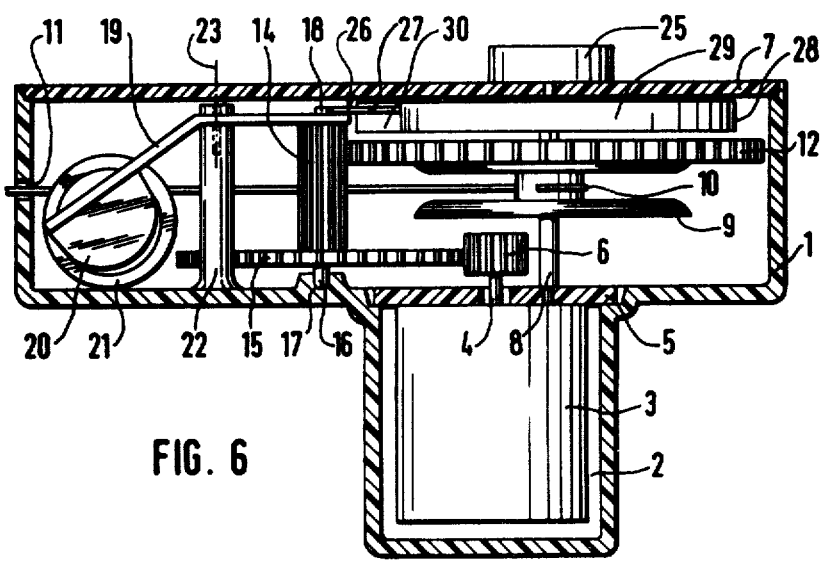
FIG. 6 is a side view partially in section of yet another regulating device in accordance with the invention.

Finally FIG. 6 shows a side view, partically in section of another regulating device in accordance with the invention. The device differs from this one shown in FIG. 3 therein that the cam wheel 29 is coupled indirectly with the element 9.

While there has been disclosed four embodiments of the invention it is to be understood that these embodiments are given by example only and not in a limiting sense.

I claim:

1. An electrical regulating device, particularly for a speed control device for motor vehicles, comprising
   a regulating member,
   means for actuating said regulating member, said means constituting a rotatably mounted element, said element is formed as a cable pulley,
   a servomotor,
   a coupleable mechanical gearing means and a coupling means therefor including an electromagnet for operatively connecting said cable pulley with said servomotor,
   an armature cooperating with said electromagnet, and
   said gearing means includes a plurality of gears, at least one of said gears of said gearing means being substantially radially and/or axially moveably mounted and being operatively connected with said armature.

2. The electrical regulating device as set forth in claim 1, wherein
   said at least one gear is indirectly connected to said armature.

3. The regulating device as set forth in claim 2, with said one gear being radially moveable, further comprising
   a housing,
   said at least one gear constitutes a gearwheel having a shaft,
   said shaft is articulated on one end thereof on said housing,
   an arm disposed on said armature, and
   the other end of said shaft is disposed on said arm.

4. The regulating device as set forth in claim 3, wherein
   said one end of said shaft is formed semi-spherically, said housing is formed with a spherical indentation,
said one end of said shaft is mounted in said spherical indentation,
said other end of said shaft is formed into a pin-shaped set-off,
said arm is formed with an opening,
said set-off is inserted through said opening in said arm.

5. The regulating device as set forth in claim 4, wherein
said cable pulley is operatively mounted on said housing,
a carrier is secured to said housing parallel to said shaft,
said arm is pivotally mounted on said carrier.

6. The regulating device as set forth in claim 1, wherein
said gearing means includes a gearwheel operatively coordinated to said at least one gear,
spring means for biasing said armature by a spring force for moving said one gear out of engagement with said gearwheel when said electromagnet is without current.

7. The regulating device as set forth in claim 1, wherein
said gearwheel is coaxially secured to said cable pulley.

8. The electrical regulating device, as set forth in claim 1, wherein
said at least one gear is directly connected to said armature.

9. The regulating device as set forth in claim 1, wherein
said at least one gear has a shaft,
said shaft and said at least one gear form an integral unit made of synthetic material.

10. The regulating device as set forth in claim 1, wherein
said regulating means is a cable windably connected to said rotatably mounted element and articulated to the throttle control rod.

11. An electrical regulating device, particularly for a speed control device for a motor vehicle having a throttle control rod, comprising
a motor vehicle speed control regulating means for adjusting the throttle control rod of the motor vehicle,
means for actuating said regulating means, said actuating means constituting a rotatably mounted element,
a servomotor,
a coupleable mechanical gearing means and a coupling means therefor including an electromagnet for operatively connecting and disconnecting, said element with and from said servomotor, respectively, independently of the action and direction of rotation of said gearing means,
an armature cooperating with said electromagnet, and
said gearing means includes a plurality of gears, at least one of said gears of said gearing means being substantially radially and/or axially moveably mounted and being operatively connected with said armature.

* * * * *